July 7, 1964          T. S. SIMMS          3,140,328
METHOD AND APPARATUS FOR CURING GASKET DEFORMITIES
Filed Sept. 2, 1960
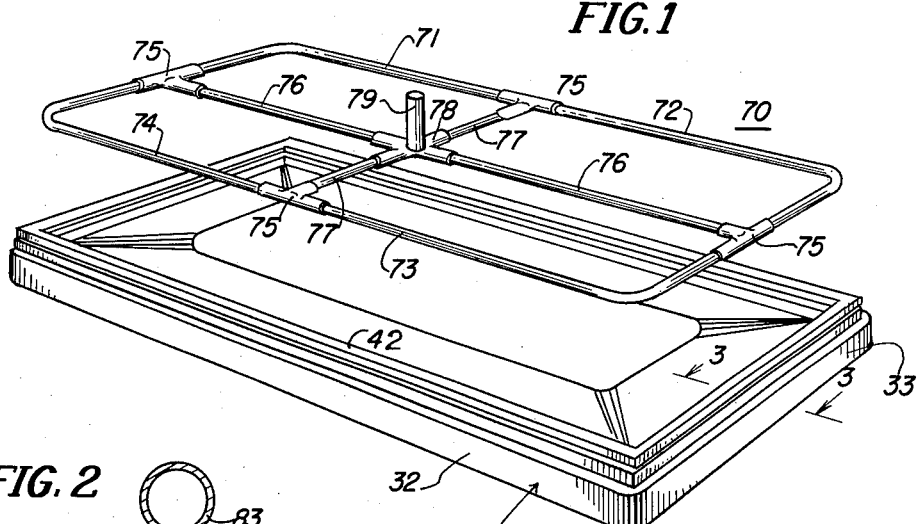
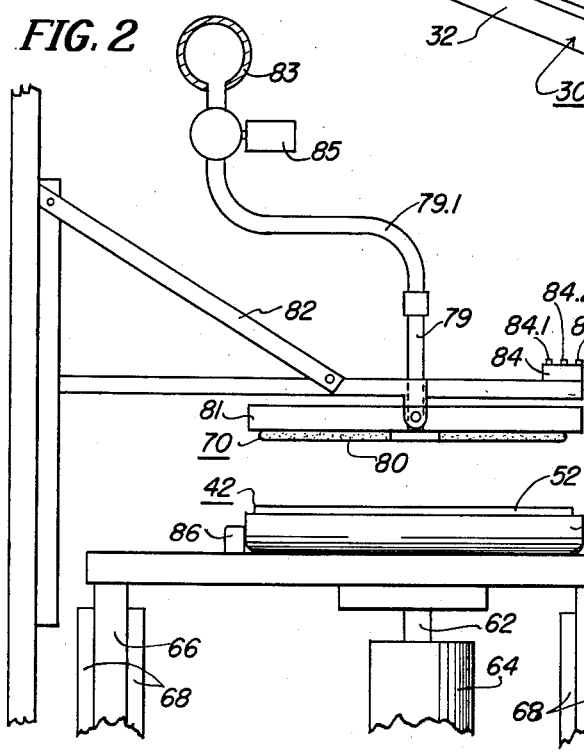
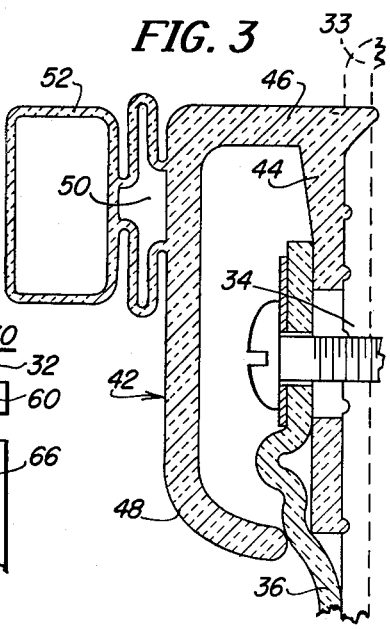
INVENTOR.
Thomas S. Simms
BY
Atty.

United States Patent Office 3,140,328
Patented July 7, 1964

3,140,328
METHOD AND APPARATUS FOR CURING
GASKET DEFORMITIES
Thomas S. Simms, Bensenville, Ill., assignor to General
Electric Company, a corporation of New York
Filed Sept. 2, 1960, Ser. No. 53,828
4 Claims. (Cl. 264—230)

The present invention relates to door gaskets and more particularly to methods and apparatus for curing deformities in gaskets once assembled to their respective doors.

The sealing gaskets used on refrigerator doors have a rather complex shape and almost without exception are manufactured by extruding vinyl chloride polymers. Individual gaskets are light in weight and the tendency of the manufacturer is to crowd as many gaskets as possible into the shipping carton, whereupon a substantial number of the gaskets are received in a creased, crushed or flattened condition, which renders them unfit for use in the "as received" condition.

It is well known that these gasket materials have a "memory"; that is, they will revert from a defective shape to the original shape of the extrusion upon the application of heat. The previous practice of reworking defective gaskets was to immerse them in boiling water, but during subsequent handling and assembly of the heated gaskets many of them would deform or wrinkle in new areas. I have found that these defective gaskets can best be reworked by actually mounting them in final position on the inner liner or panel of the refrigerator door itself and then briefly applying relatively low-temperature, moist heat to cause the gasket to restore to its manufactured shape. These door liners are usually formed of a heat sensitive material, so it is impossible for this and other reasons to immerse the assembled door panel and gasket in boiling water. While the gasket itself may be cured of its faults, the door liner would be irretrievably damaged. I have further found that by subjecting the gasket to a uniform shower of live steam for a short period, gasket links and deformities are corrected without damage to the inner lining of the door. By the use of steam, the vinyl resins are heated to temperatures sufficiently below their flow temperatures to insure that no drastic shape change occurs. The temperature to which the gasket is raised is sufficient to soften the material to a temperature at which it will recover the normal set imparted to it during the extrusion process in which the shapes were formed.

By experimentation, it was evolved that steam at a pressure of from six to eight pounds, ejected at a distance of three inches from the gasket for a duration of from five to ten seconds was sufficient to allow the vinyl material to return to its original undeformed shape without harmfully affecting the surrounding material.

It is a main object of the invention to provide an improved method for correcting deformities in gaskets formed of heat-softenable elastomeric materials.

It is another principal object of the present invention to provide means for returning deformed vinyl gaskets to satisfactory operating condition by subjecting the gasket to heat treatment while in installation position on a door or other structure.

Another object of the invention is to provide a mechanism for subjecting a gasket to corrective heat treatment over its entire length while the gasket is in its ultimate operating position.

It is a further object of the invention to provide an expandible tubular frame member substantially the shape of the periphery of a door assembly to be treated, which frame is movable from its normal position to a position closely proximate a door being treated and includes on its lower surface a plurality of equally spaced orifices for passing therethrough steam for the treatment of the door assembly.

Other objects, features and advantages of the invention will be apparent from the detailed description of a presently preferred embodiment thereof, read in connection with the accompanying drawings in which:

FIG. 1 is a top perspective view of the frame structure of the present invention poised in position above a suitable door;

FIG. 2 is a side elevational view of a preferred embodiment of the present invention;

FIG. 3 is a side sectional elevation of the gasket and partial view of the door taken at line 3—3 of FIG. 1; and FIG. 4 is a partial side elevational view of the tube 17 as it appears in FIG. 2.

Shown in FIG. 1 is a typical door assembly on which the present invention finds its utility. The door 30 has an outer shell 32 of coated metal to form the appearance exterior of the door. Said shell is formed to have a continuous sidewall 33 terminating in the inturned metal flanges 34, which serve to support an inner door liner 36 comprising what is known in the art as a door pan. This liner optimally may be formed of material such as polystyrene which is readily capable of being molded in many simple ways. Considering the service conditions of a refrigerator door liner, it is satisfactory to use the lower cost general purpose polystyrenes, which have good water and chemical resistance and are available in any number of colors and shades. However, general purpose polystyrenes which are readily workable at low temperatures and pressures are relatively low in heat resistance and readily distortable at slightly elevated temperatures. Naturally, temperature resistant polystyrenes are available but are more difficult and expensive to work and form and in normal usage are not subjected to conditions requiring the temperature resistance characteristics. The sealing gasket 42 is held in its ultimate operating position by arranging it in a clamping relationship with the door liner 36, as shown in detail in FIG. 3. Preferably this gasket may be extruded from a material such as polyvinyl resin. The purpose of the gasket is that it can be compressed between the door and the adjacent door frame when the door is closed. In this manner, the interior of the refrigerator may be effectively sealed from the exterior minimizing heat losses along the juncture of the door and frame.

As can be seen in FIG. 3 which shows a typical refrigerator gasket, the gasket 42 includes a body portion 44 which is adapted to fit tightly against the door flange 34. From this base rises at its outer edge a riser section 46 which serves to connect the platform section 48 which is cantilevered from riser section 46 to a face edge overriding the adjacent inner panel 36. This platform is freely suspended so that it may readily compress against the adjacent liner when the pressure of the door frame is exerted against the door in the closed position. The gasket further includes a bellows segment 50 of narrow wall dimension which may readily be compressed against platform 48 due to door frame pressure. A further section 52 extends from the bellows segment and may be rectangular shaped as shown to accommodate a length of magnetic material which would then hold the door to the frame. In other usages, section 52 may include a spade shape as shown in U.S. Patent 2,880,049, issued to F. L. Tarleton on March 31, 1959. In either event, the gasket is an extruded section of polyvinyl resin which has a complex wall pattern terminating in a thin-walled section spaced away from the body of the gasket.

Gaskets of this type when received from the manufacturer are often found to have been deformed, indented, kinked or rippled at various points along their length. Some of these deformities will inevitably be at the most crucial area of sealing between the door and the door frame. Since the sealing gasket is a continuous member along any one door edge and has a tight-mitered seam at each corner of the door, it is necessary that all deformities in the gasket be corrected to insure a maximum sealing effect. In the past, a number of heat application methods have been tried to alleviate these difficulties. In some of these applications, dry heat, such as derived from infra-red lamps, was applied to the gasket. This was reasonably effective if administered properly and with extreme care. Because of the high temperatures of such lamps, it was quite easy to overheat the gasket. If the heat treatment was applied with the gasket in place, the door panel would frequently warp and discolor. Immersing the unit in warm or hot water was tried. When treated apart from the door, the corrected gasket often warped and deformed in subsequent handling. Obviously, a fully assembled door could not be immersed in water, for its insulation would be soaked; and if the gasket were temporarily mounted in the door panel and the assembly immersed, it was found that the door panel had a tendency to warp even when great care was taken. Where the temperatures were safe for the thermoplastic door panel, the temperatures were insufficient to cure the defects in the gasket. Curing of the defects may generally be stated to require sufficient heat to soften the material and then allow the material to set into its natural or extruded shape without allowing undue plasticity of the gasket.

To alleviate these difficulties, the present invention was conceived; the method of practicing the invention may be readily understood from FIG. 2. In FIG. 2, there is shown a door 30 resting on table 60 with the door outer shell resting on the table top with the gasket outer section 52 extending upward. The table 60 may be piston actuated to reciprocate under the control of piston 62 within hydraulic cylinder 64. Suitable guide legs 66 adapted to ride telescopingly within tubular members 68 may be used to guide and align the travel of table in effect constraining the movement of table 60 to purely vertical motion.

Shown in FIG. 1 above the door is a rectangular frame member 70 which is comprised of four L-shaped tube sections 71, 72, 73 and 74 each joined along the cross ends of suitable T pipe fittings 75. The central leg of each fitting accommodates suitable longitudinal bracers and feeder tubes 76 and transverse bracers and feed tubes 77. All of these bracers terminate centrally in a cross shaped fitting 78 from which vertically extends a riser tube 79. This rectangular frame 70 is fitted together to allow flow of fluid from riser 79 to disperse evenly through the feeder tubes to the external members of the rectangle, i.e. 71, 72, 73 and 74. Each of these external tube members has a plurality of openings 80 shown in FIG. 4 as evenly spaced in echelon arrangement about the lower half of the tube. It should be noted that the feeder tubes 76 and 77 are imperforate, to conduct fluid to the outer rectangle for dispersion downward through the aforementioned openings 80.

Poised above the door is the tubular frame 70, previously described, whose outer rectangular dimensions closely conform to the periphery of the door and its assembled gasket. The frame may be suitably braced from above by bracing members 81 and 82 which may be secured into a wall frame structure or the like. A flexible steam inlet conduit 79.1 is connected between riser 79 and a steam source 83 with suitable valving and plumbing. Manual controls 84 which may be control of the travel of platform 60 and issuance of steam are accessible to the machine operator.

In order to utilize frame structure 70 to maximum effectiveness, the frame structure must be capable of being enlarged or contracted to fit the various door sizes normally produced. These size changes may be accomplished within adequate practical limitations by having elongated leg portions of the T and cross fittings, and telescopically accommodating the various pipe members therein. Of course, suitable slip seals (not shown) would be provided. For extreme size changes, it will be necessary only to provide appropriately longer pipe runs. To further facilitate the ease of this sizing, brace 81 could easily be calibrated and marked for the various size doors to be used.

To initiate the operation, the machine operator places door 30 on the table 60 against travel stops 86 which serve to align the door to the tubular frame 70. Limit switches (not shown) may be used in a known fashion to initiate the travel of table 60 on placing of the door against stops 86. More simply, manual controls 84.1 may be manipulated to initiate travel of table 60 from the position of FIG. 2 to the operating position (not shown). Other limit switches may be used in a known manner to limit the extent of upward travel of table 60. At that time, control 84.2 may be depressed to initiate steam flow through openings 80 and onto the exposed surface of gasket 42. This steam optimally should be at a pressure of 6-8 pounds (gage) with the openings at a distance of 3 inches from the gasket upper surface. Control 84.2 may be a momentary contact switch which energizes solenoid valve 85, of any conventional dashpot or other delay-restoring type which terminates steam flow after a period of about 10 seconds, which has been found to be sufficient to allow the vinyl to return to its extruded set form from that into which it was later deformed. In no situation has exposure for more than 30 seconds been necessary. The efficiency of this reworking method, as indicated by the brevity of the steaming operation, may be attributed to the fact that the steam is directed almost solely against the gasket. The heat of condensation is thereby used to maximum effect. Side spattering against the door panel 36 is without deleterious effect, for the steam in condensing thereon is exercising a cooling effect on the panel.

The embodiment shown could readily be modified to include a stationary table for the door and a tiltable or reciprocating steam frame. In essence such a change would not depart from the principle of the present invention.

It will be obvious that because there is no further handling of the gasket itself, there is no opportunity for additional deformities to occur.

While there has been described what is at present considered the preferred embodiment of the invention, it will be understood that it is intended to cover in the following claims all variations and modifications which fall within the scope of the appended claims.

What is claimed is:

1. The method of correcting physical deformities acquired, subsequent to manufacture, by a door gasket formed of a vinyl chloride polymer having a "memory" for its original manufactured shape, which includes the steps of assembling the said deformed gasket to its associated door in its ultimate operating position with respect to the periphery thereof, positioning in spaced relation to said gasket a steam discharge device having runs of steam-emitting apertures aligning with said gasket over the full length thereof, discharging against said gasket simultaneously along its full length a flow of steam at relatively low gage pressure until said gasket softens and returns to its original manufactured shape by virtue of its said "memory," immediately thereafter terminating said steam flow, and permitting said gasket to cool by heat flow to the ambient.

2. The method according to claim 1, in which said steam is at a pressure of from six to eight pounds per square inch (gage).

3. Apparatus for removing deformities in a door gasket of extruded vinyl chloride polymers while said gasket is secured in its ultimate position about a door panel of thermally deformable material, said gasket having a plurality of relatively thin-walled sections facing outwardly of said panel; comprising means for holding said door panel while permitting free movement of said gasket thin-walled sections, piping means coextensive with said gasket, said piping having means for simultaneously directing a plurality of jets of steam toward said gasket wall sections, and means for bringing said gasket and said piping into predetermined space relationship with said gasket, whereby said steam jets impinge substantially only against said gasket thin-walled sections to permit the same to return to their original extruded shape.

4. Apparatus for removing deformities in a door gasket of extruded vinyl chloride polymers while said gasket is in its ultimate operating position on a door structure of rectangular configuration, said gasket having a base portion secured to said door structure and unsecured portions extending outwardly therefrom, comprising means for supporting said door structure while maintaining freedom of movement of said unsecured gasket portions, means comprising a framework of piping shaped to conform to the peripheral shape of the gasket, said piping including a plurality of discharge apertures, means for effecting the juxtaposition of said mounting structure and said piping to thereby position said apertures in predetermined spaced relation to said unsecured gasket portions throughout the length thereof, means for supplying a quantity of steam at a pressure of not more than 10 pounds per square inch (gauge) into said piping framework for discharge through said apertures against said gasket portions, and in which said piping framework comprises a plurality of tube members secured in mutual telescoping relation whereby said framework may be expanded or reduced in length and in width for conformation to the longitudinal and transverse length of the gasket.

References Cited in the file of this patent
UNITED STATES PATENTS

| | | |
|---|---|---|
| 1,395,376 | White | Nov. 1, 1921 |
| 2,045,752 | Butterworth | June 30, 1936 |
| 2,110,224 | Haven | Mar. 8, 1938 |
| 2,234,994 | Vernon et al. | Mar. 18, 1941 |
| 2,388,127 | Downing | Oct. 30, 1945 |
| 2,533,609 | Nolan et al. | Dec. 12, 1950 |
| 2,565,063 | Briscoe et al. | Aug. 21, 1951 |
| 2,802,412 | Lecluyse et al. | Aug. 13, 1957 |
| 2,989,785 | Stahl | June 27, 1961 |